United States Patent [19]
Connors et al.
[11] 3,942,563
[45] Mar. 9, 1976

[54] SLIP CASTING MACHINE

[76] Inventors: Malcolm E. Connors, 87 Lowell St.; William A. Guazzaloca, 61 Arcadia Ave., both of Reading, Mass. 01867; Herbert T. Wood, 14 Upland Road, Wakefield, Mass. 01880

[22] Filed: July 5, 1974

[21] Appl. No.: 486,019

[52] U.S. Cl. .................... 141/88; 222/318; 425/447
[51] Int. Cl.$^2$. B65B 3/04; G01F 11/30; B28B 13/02
[58] Field of Search ............ 425/122, 130, 174.8 R, 425/174.8 E, 222, 217, 315, 317, 447, 231, 247, 405, 425, 437; 141/82, 131, 115; 134/135, 144, 151, 152, 172, 191, 111; 222/318, 424

[56] References Cited

UNITED STATES PATENTS

| | | | |
|---|---|---|---|
| 2,635,859 | 4/1953 | Dreyfus | 259/95 X |
| 2,675,012 | 4/1954 | Scales | 134/135 X |
| 3,017,892 | 1/1962 | Mixon | 134/144 X |
| 3,091,436 | 5/1963 | Finn | 259/95 |
| 3,162,897 | 12/1964 | Wallis | 425/217 X |
| 3,335,698 | 8/1967 | Hayon | 134/151 X |
| 3,343,555 | 9/1967 | Kasner | 134/191 X |
| 3,416,544 | 12/1968 | Paiva | 134/172 X |
| 3,500,840 | 3/1970 | Maatz | 134/191 X |
| 3,590,863 | 7/1971 | Faust | 134/144 |

*Primary Examiner*—Ronald J. Shore
*Assistant Examiner*—John S. Brown
*Attorney, Agent, or Firm*—James J. Cannon, Jr.

[57] ABSTRACT

A slip casting apparatus comprising a supply tank, a reserve well in communication with said tank, a pump means to pump said slip from said tank through a delivery means to casting molds and having provision for continuously recycling the slip in and out of the supply tank. The same pump is utilized both to deliver slip to casting molds and to recirculate slip within the supply tank, in a manner which eliminates settling and relieves the pump from undue pressure. This apparatus has application for use with other liquids of similar characteristics. The well also functions to prevent the formation of air bubbles.

7 Claims, 1 Drawing Figure

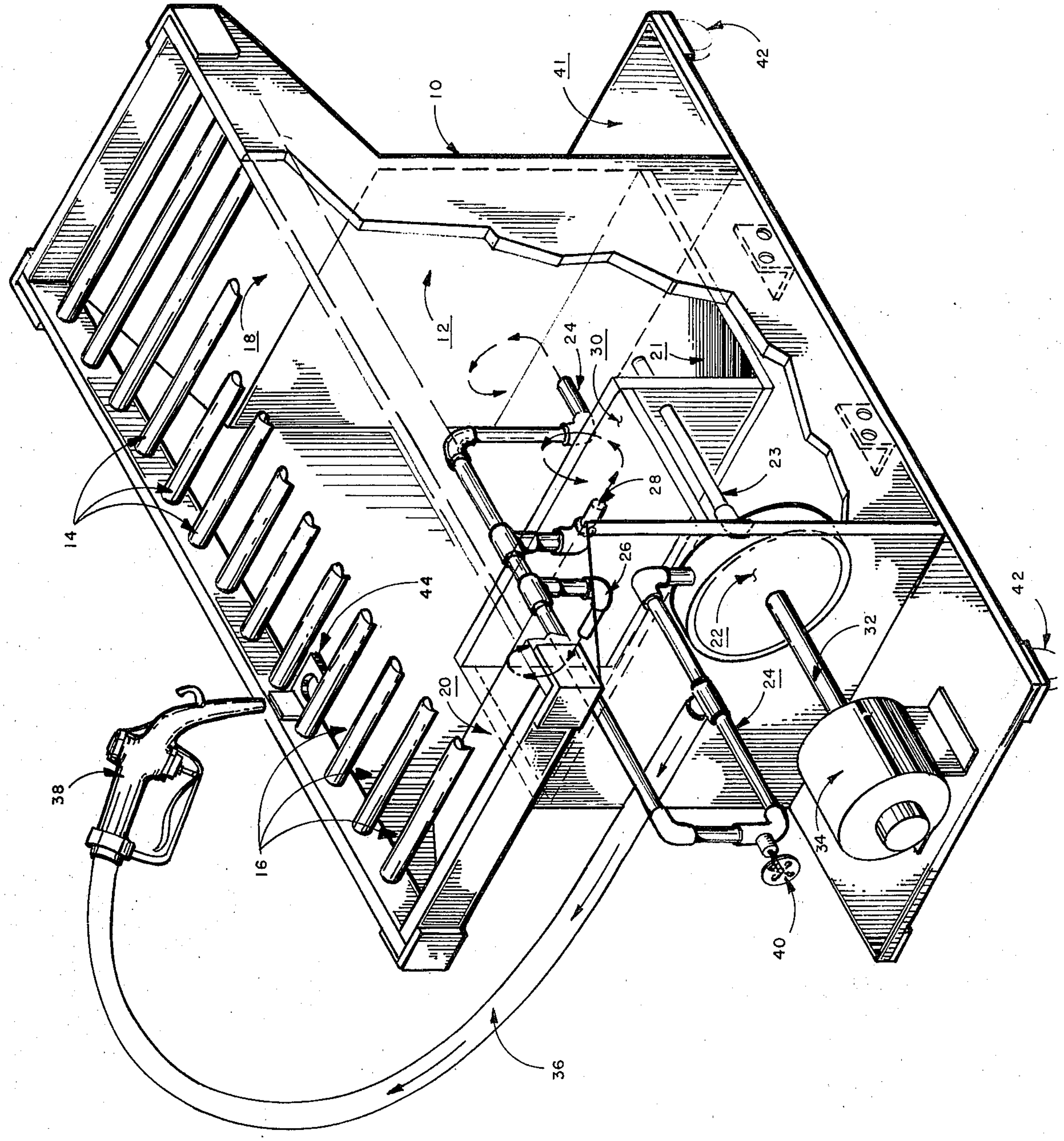
10
12
14
16
18
20
21
22
23
24
24
26
28
30
32
34
36
38
40
41
42
42
44

SLIP CASTING MACHINE

BACKGROUND OF THE INVENTION

1. Field of the Invention

The invention resides in the field of slip casting machines and more particularly relates to a slip casting apparatus comprising a supply tank, a reserve well in communication with said tank, a pump means to pump said slip from said tank through a delivery means to casting molds and having provision for continuously recycling the slip in and out of the supply tank. The same pump is utilized both to deliver slip to casting molds and to recirculate slip within the supply tank, in a manner which eliminate settling and relieves the pump from undue pressure. The well functions to prevent the formation of air bubbles.

2. Description of the Prior Art

Slip casting machines which support molds above a supply tank which catches excess slip poured from molds in the tank are well known in the prior art. They are usually accompanied by a mechanical agitator used to mix continuously the slip, i.e., liquid clay in the form of a slurry, to maintain a homogeneous consistency and to prevent premature drying. Mechanical agitators have the disadvantage of introducing air bubbles into the slip since they create a vortex at the surface of the slip and generate a certain amount of turbulence and churning in the vicinity of their action. They have the further disadvantage of having relatively short useful lives and require frequent maintenance and repair. The density of liquid slip places an extremely heavy load on the agitator motor and sometimes requires a second motor to drive the pump.

Furthermore, prior art machines which churn or agitate liquid slip frequently cause air bubbles to form in the slip. Air bubbles should be avoided in slip casting since they result in an uneven surface or thickness of the molded greenware and, if internal in the body of the finished article, result in cracks and other imperfections in the finished article upon firing.

The slip casting apparatus of the present invention is designed to avoid the above-mentioned deficiencies in prior art machines. The use of recirculation system eliminates the need for a mechanical agitator and in most cases the need for a separate motor to drive the agitator. The recirculation system prevents the liquid slip from settling, drying or otherwise becoming non-homogeneous in the supply tank, while at the same time minimizing the occurrence of air bubbles in the liquid slip. The reserve well in communication with the supply tank also serves to eliminate air bubbles in the slip as will be described below.

The inventor knows of no other apparatus based on this principle in the field of slip casting. Furthermore, the slip casting apparatus of the present invention is mechanically and functionally simpler than the prior art devices, is less expensive to manufacture and requires less maintenance and repair. Additionally, it is easily moveable despite the capacity of the supply tank, and it utilizes the full area of the mold support rack.

The apparatus of the present invention may also be utilized for pumping, recirculating and pouring or casting other liquids which have characteristic properties similar to those of liquid slip.

SUMMARY OF THE INVENTION

This invention pertains to a slip casting apparatus comprising a supply tank, a reserve well in communication with said tank, a pump means to pump said slip from said tank through a delivery means to casting molds and having provision for continuously recycling the slip in and out of the supply tank. The same pump is utilized both to deliver slip to casting molds and to recirculate slip within the supply tank, in a manner which eliminates settling and relieves undue pressure on the pump. The well also functions to prevent the formation of air bubbles. A support rack for molds, preferably a plurality of spaced-apart rollers, is positioned above the supply tank such that any excess or overflow from the molds will fall back into the tank. The pump delivers slip to the molds by using, for example, a flexible hose and a hand-held, squeezably activated nozzle of the type used in gas pumps. The pump is shaft driven by an electrical motor eliminating the need for belts.

The slip supply tank of the present invention may be of any conventional size, shape and design, except that it includes an integrally formed, depressed reserve well in communication with and lower than the principal supply tank.

The pump draws slip through a well outlet pipe whose opening is positioned below the bottom of the principal supply tank and above the bottom of the reserve well. The slip is fed by said pump through a valve into either the delivery hose or back into the principal supply tank or into both. The feed-back of slip into the supply tank results in a continual recirculation of the slip in the supply tank for the purposes of preventing drying and maintaining uniform consistency. The use of the reserve well enables the outlet pipe to be positioned in a location which prevents the formation of a vortex as slip is drawn from the supply tank, thus minimizing the formation of air bubbles.

The overall apparatus is lightweight, easily moveable, simpler in construction and less expensive to manufacture and maintain than other devices of the same type known to the inventor.

The apparatus of the present invention may be utilized with any liquid substance requiring its features and advantages.

The detailed structure is more fully described in the Description of the Preferred Embodiment and the Drawing which follow.

DESCRIPTION OF THE DRAWING

The FIGURE is a perspective view of the preferred embodiment of the invention.

DESCRIPTION OF THE PREFERRED EMBODIMENT

Referring to the FIGURE, there is shown a perspective view of the preferred embodiment of the invention. The slip casting apparatus is contained generally in a housing 10, a portion of which forms the walls of slip supply tank 12, above which is positioned a mold support rack comprised of spaced apart rollers 14. The rollers 14 are especially desirable since they allow easy cleaning and prevent dried slip accumulation underneath the rack. The excess slip overflowing or poured from the molds, not shown, falls between the roller spaces 16 or slides off the rollers 14 directly into the tank or onto graded surfaces 18 and 20 which slope into the tank. Tank 12 has integrally formed therewith a depressed reserve well 21 in communication with and lower than the base 30 of principal supply tank 12.

Pump 22 is fed by a well outlet pipe 23 and forces slip drawn from the well 21 through a pump outlet pipe 24 back into the tank 12 where it is mixed and recirculated with the main slip supply within tank 12. Well outlet pipe 23 is preferably located above the bottom of well 21 and below the base 30 of the pricipal supply tank 12 to prevent the formation of a vortex as the slip is drawn from well 21. Optionally, to provide a wider distribution to obtain even greater slip homogeneity, branch pump outlet pipes 26 and 28 may be employed to disburse slip over base 30 of supply tank 12 which is positioned above the mouth of pipe 24. Base 30 is located close below the outlets of pipes 26 and 28 to prevent splashing.

Pump 22, connected directly to and driven by the shaft 32 of electric motor 34, is additionally used to deliver slip to the vicinity of the molds through flexible hose 36. A hand-held, squeezably activated nozzle 38 is used to control the delivery flow of the slip as the hose and nozzle are moved from mold to mold. Optionally, a fixed delivery pipe may be used with a faucet terminal under which the molds are passed.

Recirculation and delivery flow control valve 40 is used to control the amount of slip which is circulated into the well and the amount which is channeled into hose 36. During casting operations valve 40 may be closed to divert all of the slip to the molds.

Other features of convenience may be added to the structure at the option of the user. For example, the entire apparatus may be mounted on platform 41 and wheels 42 to facilitate mobility. A holder 44 for nozzle 38 can be provided. Similarly, a cover, not shown, can be utilized over the rack to prevent evaporation between casting operations. A faucet, not shown, may also be provided in the bottom of the supply well to drain the slip if the apparatus is not to be used for a period of time.

It should be clearly understood that the apparatus of the present invention is readily adaptable for the casting, pouring or recirculation of other liquid substances, especially those which have similar characteristics. The invention simplifies the handling of liquid substances which set quickly and must be kept in a homogeneous state.

These and other features and modifications will be obvious to those skilled in the art upon disclosure of the invention as defined by the following claims.

We claim:

1. An improved clay slip mixing and casting apparatus for recirculation, agitation and uniform mixing of said slip in turn yielding a homogenous slip capable of regulated delivery to a mold positioned upon a integrated receiving and casting support roller bar rack, which in combination comprises:

a housing;

a principal supply tank within said housing for containing said slip;

a depressed reserve well integrated into and extending below said principal supply tank and communicating with the base of said principal supply tank and said housing;

a well outlet pipe;

a pump mounted within said housing for drawing said slip from said well through said well outlet pipe, for forcing said slip to recirculate into said supply tank, and for forcing delivery of said slip to said casting support rack;

a pump outlet pipe providing means through which said pump forces said slip recirculation to said supply tank and said slip delivery to said casting support rack;

a delivery pipe means interrupting and secured to said pump outlet pipe providing means for delivery of said slip to said casting support rack;

a valve further interrupting said pump outlet pipe, beyond said delivery pipe, for regulating and restricting the volume of slip recirculated and delivered; and said pump outlet pipe terminating at the juncture of said supply tank and said reserve well, and facilitating, in combination with said well outlet pipe flow, self activated agitation and mixing functions of said apparatus.

2. The apparatus of claim 1 wherein said outlet pipe further includes at least one branch outlet pipe for recirculating and disbursing said slip over said base of said supply tank yielding greater slip homogeneity and further eliminating and preventing vortex formaton due to agitation.

3. The apparatus of claim 1 wherein said delivery pipe, its receiving end secured to said outlet pipe, further includes a delivery end comprising a hand held squeezably activated valve and nozzle allowing complete manual closed system control of the delivery function of said apparatus and the recirculation function of said apparatus.

4. The apparatus of claim 3 wherein said delivery pipe is flexible and movable.

5. The apparatus of claim 1 wherein said casting support rack comprises a plurality of spaced apart stationary rollable roller bars positioned above said principal supply tank allowing uncast excess slip to recycle; said roller bars allowing movable assembly line molding production and allowing simple cleanup.

6. The apparatus of claim 1 wherein said pump is operated by an appropriate power means.

7. The apparatus of claim 2 wherein said apparatus is capable of said self-agitation and mixing functions of other liquid or semi-fluid substances, especially those which have similar heavy, slow flow characteristics as said clay slip.

* * * * *